United States Patent
Taguchi et al.

(10) Patent No.: US 8,454,329 B2
(45) Date of Patent: Jun. 4, 2013

(54) SEALED TERMINAL DEVICE FOR MOTOR-DRIVEN COMPRESSOR

(75) Inventors: Masanori Taguchi, Takasaki (JP); Masahiko Osaka, Ohta (JP); Eiichi Oshio, Isesaki (JP); Kazuhiko Kameyama, Isesaki (JP); Satoru Saito, Hinterm Hain (DE)

(73) Assignee: Sanden Corporation, Gunma (JP)

( * ) Notice: Subject to any disclaimer, the term of this patent is extended or adjusted under 35 U.S.C. 154(b) by 486 days.

(21) Appl. No.: 12/307,117

(22) PCT Filed: Jun. 25, 2007

(86) PCT No.: PCT/JP2007/062709
§ 371 (c)(1),
(2), (4) Date: Dec. 30, 2008

(87) PCT Pub. No.: WO2008/007534
PCT Pub. Date: Jan. 17, 2008

(65) Prior Publication Data
US 2009/0315417 A1 Dec. 24, 2009

(30) Foreign Application Priority Data
Jul. 11, 2006 (JP) .................. 2006-190200

(51) Int. Cl.
F04B 39/00 (2006.01)
H02K 5/22 (2006.01)
H02K 3/50 (2006.01)

(52) U.S. Cl.
USPC ............................ 417/422; 310/71

(58) Field of Classification Search
USPC ............................ 310/71; 417/422
See application file for complete search history.

(56) References Cited

U.S. PATENT DOCUMENTS

| 3,388,368 | A | * | 6/1968 | Sauber | 439/559 |
| 3,850,501 | A | * | 11/1974 | Butterfield et al. | 439/196 |
| 4,205,246 | A | * | 5/1980 | Wise et al. | 310/68 C |
| 4,614,397 | A | * | 9/1986 | Flanigan | 439/569 |
| 4,822,473 | A | * | 4/1989 | Arnesen | 204/667 |
| 4,905,069 | A | | 2/1990 | Shigekane | |
| 6,657,336 | B2 | * | 12/2003 | Morikaku et al. | 310/68 D |
| 6,910,904 | B2 | * | 6/2005 | Herrick et al. | 439/271 |
| 2005/0111994 | A1 | * | 5/2005 | Kimura et al. | 417/313 |
| 2005/0218733 | A1 | | 10/2005 | Gandrud | |

FOREIGN PATENT DOCUMENTS

| CN | 2180510 Y | 10/1994 |
| EP | 0145256 | 6/1985 |
| JP | 50-63494 | 5/1975 |
| JP | 56-67675 | 10/1979 |

(Continued)

OTHER PUBLICATIONS

Office Action dated Nov. 9, 2011 in the corresponding Japanese Patent Application No. 2006-190200.

*Primary Examiner* — Burton Mullins
(74) *Attorney, Agent, or Firm* — Cozen O'Connor

(57) ABSTRACT

A sealed terminal device for a motor-driven compressor has an electrically insulating terminal holder (12) to be attached to the housing wall (2a) of the motor-driven compressor, a plurality of sealed terminals (18) held in the terminal holder (12), for penetrating the housing wall (2a) with play to the housing wall (2a), and a groove (40) or cavity (38) formed in the terminal holder (12) to increase a creepage distance for insulation between the sealed terminals.

9 Claims, 4 Drawing Sheets

FOREIGN PATENT DOCUMENTS

| | | |
|---|---|---|
| JP | 60-0801660 | 6/1985 |
| JP | 81660/1985 | 6/1985 |
| JP | 7963/1988 | 1/1988 |
| JP | 6-185463 | 7/1994 |
| JP | 07-22092 | 4/1995 |
| JP | 11-324920 | 11/1999 |
| JP | 2002-155862 | 5/2002 |
| JP | 2003-129983 | 5/2003 |
| JP | 2003-161265 | 6/2003 |
| JP | 2005-54727 | 3/2005 |
| WO | WO 00/38290 | 6/2000 |

* cited by examiner

SEALED TERMINAL DEVICE FOR MOTOR-DRIVEN COMPRESSOR

RELATED APPLICATIONS

This is a U.S. National Phase Application under 35 USC §371 of International Application PCT/JP2007/1062709 filed on Jun. 25, 2007.

This application claims the priority of Japanese patent application no. 2006-190200 filed Jul. 11, 2006, the content of which is hereby incorporated by reference.

TECHNICAL FIELD

The present invention relates to a motor-driven compressor incorporating an electric motor, and particularly relates to a sealed terminal device for establishing electrical connection between an electric motor and an external device.

BACKGROUND ART

This kind of motor-driven compressor includes a housing, and a compressing unit and an electric motor which are accommodated in the housing (Patent Document 1). The compressing unit is driven by the electric motor, and performs a series of processes from the suction of a working fluid, compression, and discharge.

The compressor further includes a sealed terminal device for establishing electric connection between the electric motor and an external device, and the sealed terminal device includes a plurality of sealed terminals. These sealed terminals penetrate the wall of the housing airtightly, and each have both end portions projecting into and outside the housing.

Patent documents 1: Japanese Unexamined Patent Publication No. Hei 11-324920

DISCLOSURE OF THE INVENTION

Problems to be Solved by the Invention

The aforementioned sealed terminals are fixed to the wall of the housing via glass and metal holders, and this glass maintains the interior of the housing airtight while electrically insulating between the sealed terminals and metal holders and between the sealed terminals and the wall of the housing.

However, to secure the adhesion between the metal holders and glass, the use of glass not only requires the process of plating nickel on the metal holders, but also needs a lot of works to fix the metal holders and the sealed terminals. In case of the sealed terminal device using glass, therefore, it is not easy to attach the sealed terminal device to the wall of the housing.

Since electric insulation between the sealed terminals is established with glass alone, if the distance between the sealed terminals is short, electric insulation between the sealed terminals decreases. Therefore, it is not easy to miniaturize a sealed terminal device using glass.

It is an object of the present invention to provide a sealed terminal device for a motor-driven compressor which facilitates attachment of a sealed terminal while sufficiently securing electric insulation between the sealed terminal and the surrounding thereof, and which can be miniaturized as a whole.

Means for Solving the Problems

To achieve the object, a sealed terminal device according to the present invention comprises a terminal holder to be attached to a wall of the housing and including internal and external holder half bodies which have electric insulation and sandwiching the wall, a plurality of sealed terminals held in the terminal holder, for penetrating the wall with play thereto and having both end portions to be electrically connected to the electric motor and an external device, seal members for sealing between the wall and the terminal holder and between the terminal holder and the sealed terminals, respectively and an insulating element for increasing a degree of electric insulation between the sealed terminal and a surrounding thereof.

Because the sealed terminal device has the seal members and the insulating element separately, it is possible to sufficiently secure electric insulation between the sealed terminal and the surrounding thereof while securing sufficient sealing of the sealed terminal device. Therefore, the sealed terminal device according to the invention can shorten the distance needed between the sealed terminals, thus as a whole making the miniaturization possible.

Specifically, the insulating element can include an area formed in the terminal holder to increase a creepage distance for insulation of at least one of between the sealed terminals and between the wall and the sealed terminals. In this case, the area can have a groove formed in an outer surface of the terminal holder, and extending between the sealed terminals and/or a cavity formed in the terminal holder. Such a groove and cavity increase the creepage distance for insulation between the sealed terminals and between the sealed terminal and the wall of the housing, thus improving the degree of electric insulation of the sealed terminals to the surrounding.

It is preferable that the groove should extend in a radial direction of the terminal holder, and the cavity should be positioned to surround the sealed terminals and adjacent to the wall.

Further, the insulating element can include an electric insulation barrier intervened between the sealed terminals, and the electric insulation barrier has an electrical insulation layer formed on an outer surface of the sealed terminal. In this case, it is preferable that the electrical insulation layer should cover an entire outer surface of the sealed terminal except for both the end portions of the sealed terminal. Such an electrical insulation layer increases the degree of electric insulation between the sealed terminals as well as between the sealed terminals and the wall of the housing.

When the motor-driven compressor is used to compress a refrigerant in a refrigeration circuit, the electrical insulation layer ensures the direct contact of the refrigerant to the sealed terminals. Therefore, short-circuiting between the sealed terminals and the surrounding via the refrigerant does not occur. Further, the insulating element can include an insulating sleeve to fill in the play between the wall of the housing and the sealed terminal.

It is preferable that the sealed terminal should also serve as a fastening bolt to attach the terminal holder to the wall of the housing. In this case, it becomes easy to attach the terminal holder to the wall of the housing.

Specifically, it is preferable that the sealed terminal should further include a rod having one end to be positioned on the electric motor side and the other end to be positioned on the external device side, a flange formed on the rod for sandwiching one of the holder half bodies between the flange and the wall, and a fastening nut attached to the other end of the rod to fasten the other one of the holder half bodies between the nut and the wall of the housing. In this case, it is preferable that the terminal holder should further include a stopper surface which makes a lock for the sealed terminal.

Effect of the Invention

Because the sealed terminal device for a motor-driven compressor according to the present invention has the seal

BEST MODE FOR CARRYING OUT THE INVENTION

Figure 1:
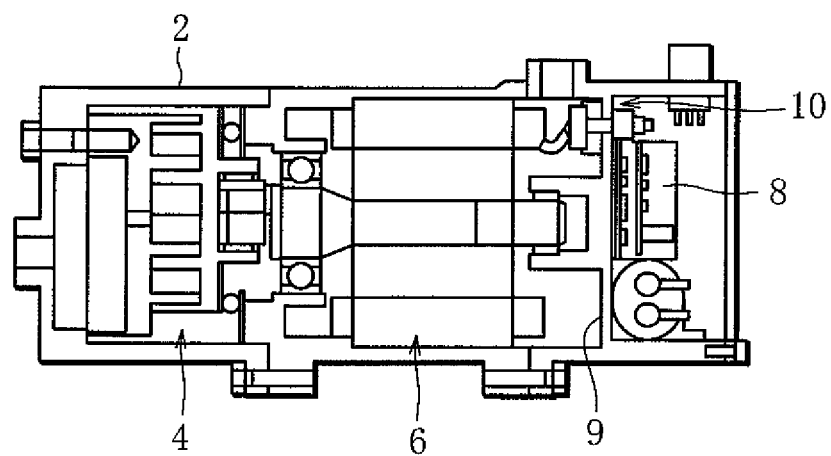
FIG. 1 shows one type of motor-driven compressor to which the present invention is adapted and which has a power supply control board arranged in the housing thereof.
Figure 2:
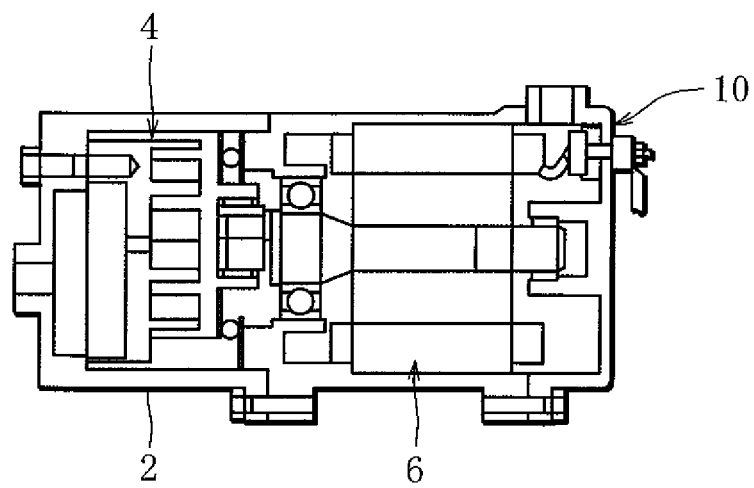
FIG. 2 shows another type of motor-driven compressor to which the present invention is adapted and which has the power supply control board outside the housing thereof.

FIGS. 1 and 2 respectively show motor-driven compressors to which the present invention is adapted. Each of the motor-driven compressors has a metal housing 2, and a compressing unit 4 and an electric motor 6 which are accommodated in the housing 2. The compressing units 4 of FIGS. 1 and 2 are shown as a scroll unit.

The compressor of FIG. 1 further has a power supply control board 8 accommodated in the housing 2. The control board 8 includes an inverter to control power supply to the electric motor 6, and driving of the electric motor 6. More specifically, a partition wall 9 is disposed in the housing 2 of FIG. 1, and separates the interior of the housing 2 into a room for accommodating the compressing unit 4 and electric motor 6 and a room for accommodating the control board 8.

The compressor of FIG. 2 differs from the compressor of FIG. 1 in that it does not have the partition wall 9. However, each of the motor-driven compressors of FIGS. 1 and 2 has a sealed terminal device 10 to electrically connect the electric motor 6 or the control board 8 to an electric device (not shown) outside the housing 2, and the sealed terminal device 10 is attached to the housing wall of the housing 2, which is the partition wall or the outer wall of the housing 2.

Figure 3:
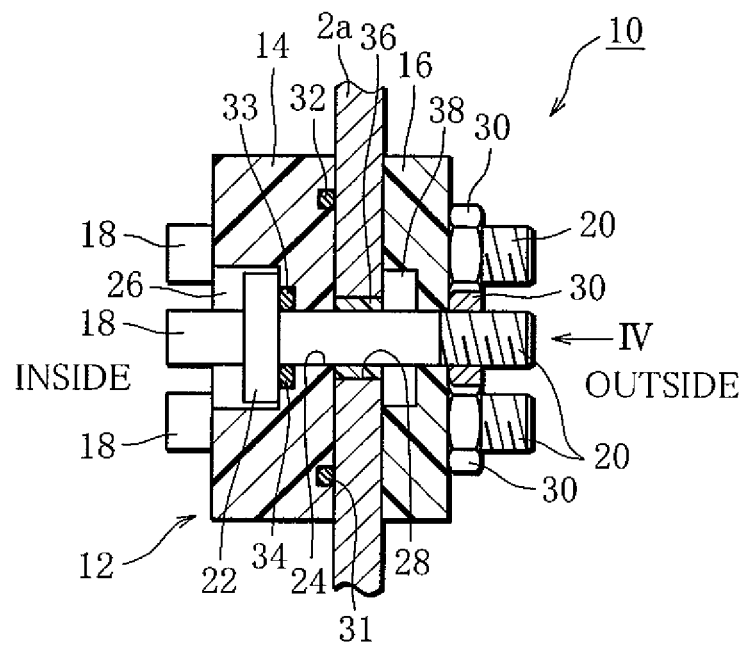
FIG. 3 is a cross-sectional view showing a sealed terminal device according to a first embodiment.
Figure 4:
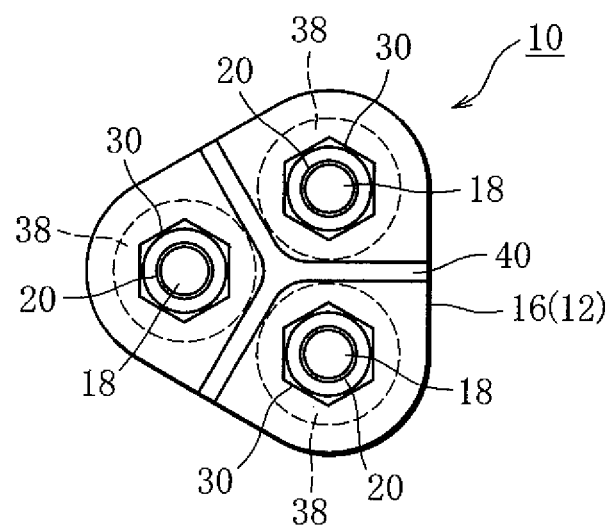
FIG. 4 shows a view as seen from an arrow direction IV in FIG. 3.
Figure 5:
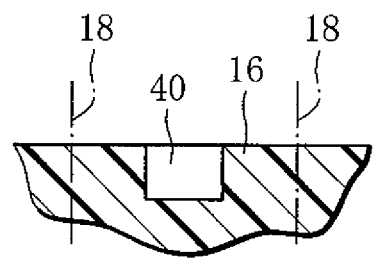
FIG. 5 is a cross-sectional view showing in enlargement a groove in FIG. 4.

FIGS. 3 to 5 show the sealed terminal device 10 according to the first embodiment.

As shown in FIG. 3, the sealed terminal device 10 has a terminal holder 12, which includes holder half bodies 14 and 16. As apparent from FIG. 4, each of the holder half bodies 14 and 16 has a triangular shape and is formed of an electrical insulation material, such as ceramics or a synthetic resin. In this embodiment, the material for the holder half bodies 14 and 16 is a synthetic resin.

The holder half bodies 14 and 16 are arranged sandwiching a housing wall 2a. Specifically, the holder half body 14 is located on the electric motor 6 side, i.e., inward of the housing wall 2a, and the holder half body 16 is located outward of the housing wall 2a. The sealed terminal device 10 further has a plurality of, e.g., three, sealed terminals 18 which serve as fastening bolts to fasten the terminal holder 12 or the holder half bodies 14 and 16 to the housing wall 2a.

More specifically, each sealed terminal 18 comprises a conductive rod member, and has a screw 20 at one end portion thereof, and a flange 22 at the other end portion thereof with a predetermined length secured between the flange 22 and the other end of the sealed terminal 18. One end of each sealed terminal 18 is formed as an outside terminal end and the other end thereof is formed as an inside terminal end.

Further, three insertion holes 24 are formed in the terminal holder 12, and are arranged at equal intervals in the circumferential direction of the terminal holder 12.

Specifically, the three insertion holes 24 are respectively positioned at the corners of the triangular holder half body 14, 16, and penetrate the holder half bodies. Each insertion hole 24 has a recess 26 which is formed in the inner end face of the holder half body 14. The recess 26 is larger in diameter than the insertion hole 24, and can receive the flange 22 of the sealed terminal 18 inside.

Three through holes 28 are formed in the housing wall 2a. The through holes 28 are arranged in correspondence to the through holes 24 of the terminal holder 12, and have an inner diameter larger than the inner diameter of the insertion holes 24.

As apparent from FIG. 3, the terminal holder 12 is arranged with respect to the housing wall 2a in such a way as to sandwich the housing wall 2a between the holder half bodies 14 and 16, and each sealed terminal 18 is inserted into the corresponding insertion hole 24 and through hole 28 from the holder half body 14 side with its screw 20 as the head. The insertion of the sealed terminal 18 is stopped when the flange 22 abuts on the bottom of the corresponding recess 26, at which time the screw 20 protrudes from the outer end face of the holder half body 16.

Then, a nut 30 is screwed on the protruding screw 20 and the nut 30 is pressed against the holder half body 16.

Accordingly, the holder half bodies 14 and 16 are fastened together with the housing wall 2a sandwiched between the flanges 22 of the sealed terminal 18 and the nut 30, resulting completion of the attachment of the terminal holder 12 to the housing wall 2a.

With the terminal holder 12 attached, the inner terminal end of each sealed terminal 18 protrudes from the inner end face of the terminal holder 12, while its outer terminal end or the screw 20 protrudes from the outer end face of the terminal holder 12. The inner terminal end is electrically connected to the electric motor 6 via a lead (not shown), while the screw 20 is electrically connected to the control board 8 via a lead (not shown).

As shown in FIG. 3, the holder half body 14 has an abutment face which abuts on the housing wall 2a, and an annular groove 31 formed in the abutment surface. The annular groove 31 has a size to surround the three insertion holes 24 from outside, and extends along the periphery edge of the holder half body 14. An O ring 32 is fitted in the annular groove 31, and seals between the holder half body 14 and the housing wall 2a airtightly.

Annular grooves 33 are formed in the bottoms of the individual recesses 26, and surround the corresponding sealed terminals 18. O rings 34 are respectively fitted in those annular grooves, and each O ring 34 is pushed against the bottom and inner wall of the annular groove 33 by the flange 22 of the sealed terminal 18 to seal between the corresponding sealed terminal 18 and the holder half body 14 airtightly. Therefore, when the motor-driven compressor is used to compress the refrigerant in the refrigeration circuit, the refrigerant does not leak out of the housing 2 through the sealed terminal device 10.

As shown in FIG. 3, an insulating sleeve 36 is disposed in each through hole 28 of the housing wall 2a, and the insulating sleeve 36 is positioned between the through hole 2 and the corresponding sealed terminal 18 to disconnect the electric connection between the sealed terminal 18 and the housing wall 2a.

The terminal holder 12 further includes three cavities 38 corresponding to each sealed terminal 18. The cavities 38 are recesses formed in the surface of the holder half body 16 which abuts on the housing wall 2a, and are positioned adjacent to the housing wall 2a.

Further, as shown in FIGS. 4 and 5, three grooves 40 are formed in the outer end face of the holder half body 16, and extend between the sealed terminals 18 adjacent in the circumferential direction of the terminal holder 12 to the outer peripheral surface of the holder half body 16 in the radial direction thereof, and are aggregated at the center of the holder half body 16. That is, the three grooves 40 form a Y shape. The one-dot chain line in FIG. 5 shows the axial line of the sealed terminal 18.

The grooves 40 lengthen the creepage distance for insulation between the adjoining sealed terminals 18, and increase the degree of electric insulation between the sealed terminals 18. In addition, the cavities 38 likewise lengthen the creepage distance for insulation between the sealed terminals 18 and the housing wall 2a, and the creepage distance for insulation between the adjoining sealed terminals 18, and further increase the degree of electric insulation between the sealed terminals 18 and the housing wall 2a, and between the sealed terminals 18. As a result, the distance between the sealed terminals 18 can be made shorter without reducing the electric insulation between the sealed terminals 18, thus making it possible to make the sealed terminal device 10 compact.

Next, sealed terminal devices according to second and third embodiments will be described below; in describing the second and third embodiments, same reference numerals are given to those members and parts which exhibit the same functions as the members and parts of the first embodiment to omit their descriptions.

Figure 6:
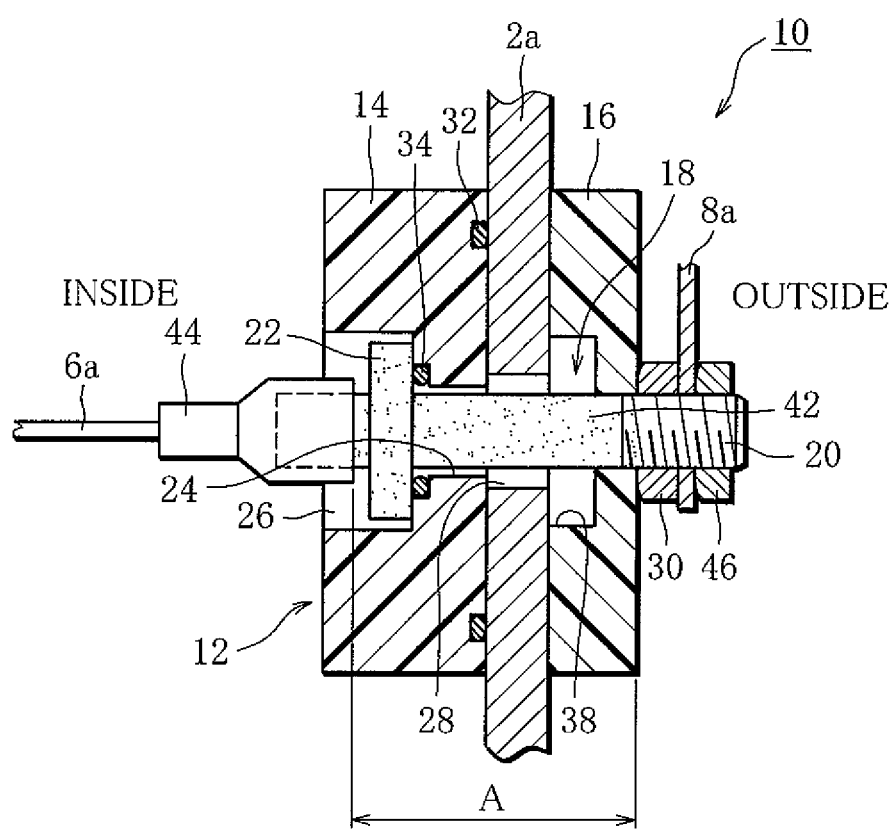
FIG. 6 is a cross-sectional view showing a sealed terminal device according to a second embodiment.

FIG. 6 shows the sealed terminal device according to the second embodiment.

Although FIG. 6 shows only one sealed terminal 18, the device of the second embodiment also has three sealed terminals 18.

In the case of the second embodiment, each sealed terminal 18 has an electrical insulation layer 42 on its outer surface. The electrical insulation layer 42 covers the outer surface of the sealed terminal 18 in an area A in FIG. 6, excluding both end portions of the sealed terminal 18, i.e., the aforementioned inner terminal end and outer terminal end.

Such an electrical insulation layer 42 can be formed by, for example, an insulating varnish applied to the area A of the sealed terminal 18. When the sealed terminal 18 is formed of aluminum, the electrical insulation layer 42 can be formed by an aluminum oxide film obtained through an alumite treatment performed on the area A of the sealed terminal 18.

FIG. 6 also shows the connection between a connector 44 of a lead 6a extending from the electric motor 6 and the inner terminal end of the sealed terminal 18, and the connection between a lead 8a from the control board 8 and the outer terminal end of the sealed terminal 18. The connector 44 overlaps the electrical insulation layer 42 when receiving the inner terminal end of the sealed terminal 18, and the lead 8a is pinched between the aforementioned nut 30 and a connector nut 46.

The electrical insulation layer 42 serves as an electric insulation barrier positioned between the adjoining sealed terminals 18, and increases the degree of electric insulation between the sealed terminals 18. When the motor-driven compressor is used to compress the refrigerant of the refrigeration circuit, the electrical insulation layer 42 inhibits directly the contact of the outer surface of the sealed terminal 18 with the refrigerant. Therefore, the short-circuiting between the sealed terminals 18 and between the sealed terminals 18 and the housing wall 2a through the refrigerant does not occur, and the electric insulation of the sealed terminal device is improved significantly.

Figure 7:
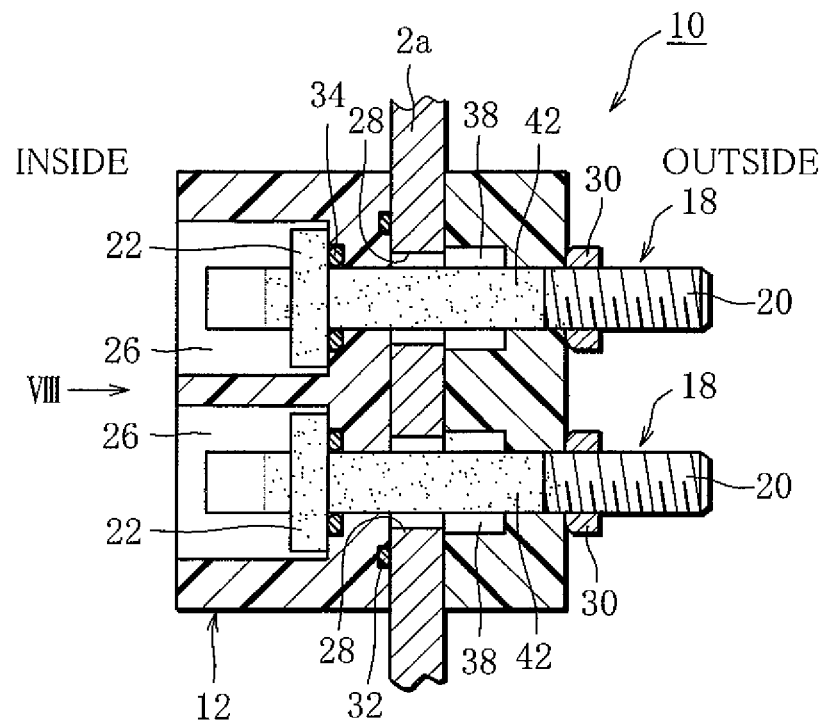
FIG. 7 is a cross-sectional view showing a sealed terminal device according to a third embodiment.
Figure 8:
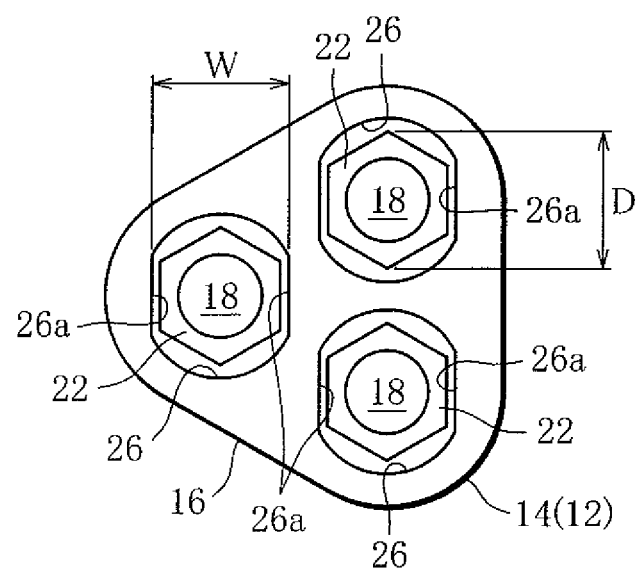
FIG. 8 shows a view as seen from an arrow direction VIII in FIG. 7.

FIGS. 7 and 8 show a sealed terminal device 10 according to the third embodiment.

The sealed terminal 18 of the third embodiment includes not only the aforementioned electrical insulation layer 42 but also a locking mechanism for the sealed terminal 18. As apparent from FIG. 8, the locking mechanism is realized by making the flange 22 of the sealed terminal 18 into a hexagonal shape, and making the recess 26 of the communicating hole 24 into an elliptical shape. The maximum diameter D of the flange 22 is larger than the width W of the recess 26 in the minor-axial direction, and the recess 26 has two flat inner wall surfaces 26a along the major axis, and the inner wall surfaces 26a form a stopper surface which inhibits the rotation of the sealed terminal 18.

The present invention is not restricted to the first to third embodiments, and various modifications are possible.

For example, the O ring 32 and the cavity 38 may be provided in each of the holder half bodies 14 and 16.

The invention claimed is:

1. A sealed terminal device for a motor-driven compressor including a housing, and an electric motor and a compressing unit which are accommodated in the housing, comprising:
    a terminal holder to be attached to a wall of the housing and including internal and external holder half bodies which have electric insulation and sandwiching the wall;
    a plurality of sealed terminals held in said terminal holder, each sealed terminal penetrating the wall with play thereto and having both end portions to be electrically connected to the electric motor and an external device;
    seal members for sealing between the wall and said terminal holder and between said terminal holder and said sealed terminals, respectively; and
    an insulating element for increasing a degree of electric insulation between said sealed terminal and a surrounding thereof,
    wherein said insulating element includes an area formed in said terminal holder to increase a creepage distance for insulation of at least one of between said sealed terminals and between the wall and said sealed terminals,
    wherein said area includes a groove formed in an outer surface of said terminal holder, and extending between said sealed terminals, and
    wherein the groove extends in a radial direction of said terminal holder.

2. The sealed terminal device according to claim 1, wherein said area has a cavity formed in said terminal holder, and positioned to surround said sealed terminals, and adjacent to the wall.

3. The sealed terminal device according to claim 1, wherein said insulating element includes an electric insulation barrier between said sealed terminals.

4. The sealed terminal device according to claim 3, wherein the electric insulation barrier has an electrical insulation layer formed on an outer surface of said sealed terminal.

5. The sealed terminal device according to claim 4, wherein the electrical insulation layer covers an entire outer surface of said sealed terminal except for both the end portions of said sealed terminal.

6. The sealed terminal device according to claim 1, wherein said insulating element includes an insulating sleeve to fill in the play between the wall of the housing and said sealed terminal.

7. The sealed terminal device according to claim 1, wherein said sealed terminal also serves as a fastening bolt to attach said terminal holder to the wall of the housing.

8. The sealed terminal device according to claim 7, wherein said sealed terminal further includes:
   a rod having one end to be positioned on the electric motor side and the other end to be positioned on the external device side;
   a flange formed on the rod for sandwiching one of the holder half bodies between the flange and the wall; and
   a fastening nut attached to the other end of the rod to fasten the other one of the holder half bodies between the nut and the wall of the housing.

9. The sealed terminal device according to claim 7, wherein said terminal holder further includes a stopper surface which makes a lock for said sealed terminal.

* * * * *